United States Patent
Muehlhausen

[11] Patent Number: 5,967,591
[45] Date of Patent: Oct. 19, 1999

[54] ROOF STRUCTURE OF AN OPEN AUTOMOBILE

[75] Inventor: Mark Muehlhausen, Stuttgart, Germany

[73] Assignee: Daimler Chrysler AG, Germany

[21] Appl. No.: 08/921,564

[22] Filed: Sep. 2, 1997

[30] Foreign Application Priority Data

Sep. 2, 1996 [DE] Germany .................. 196 35 536

[51] Int. Cl.⁶ ...................................... B60J 7/00
[52] U.S. Cl. ................ 296/107.16; 296/107.17; 296/107.76; 296/116; 296/147
[58] Field of Search ................... 296/116, 117, 296/107.76, 107.17, 107.16

[56] References Cited

U.S. PATENT DOCUMENTS

| | | | |
|---|---|---|---|
| 2,704,225 | 3/1955 | Anschuetz et al. | 296/116 |
| 4,711,485 | 12/1987 | Maebayashi et al. | 296/116 |
| 4,729,592 | 3/1988 | Tuchiya et al. | 296/107.16 |
| 4,776,630 | 10/1988 | Fukutomi et al. | 296/107.17 |
| 4,796,943 | 1/1989 | Fukutomi et al. | 296/117 |
| 4,895,409 | 1/1990 | Konishi et al. | 296/107.17 |
| 5,195,798 | 3/1993 | Klein et al. | 296/116 |
| 5,265,930 | 11/1993 | Klein et al. | 296/116 |
| 5,429,409 | 7/1995 | Corder et al. | 296/116 |
| 5,490,709 | 2/1996 | Rahn | 296/117 |
| 5,520,432 | 5/1996 | Gmeiner et al. | 296/117 |
| 5,533,777 | 7/1996 | Kleemann et al. | 296/117 |
| 5,558,388 | 9/1996 | Fürst et al. | 296/117 |
| 5,593,202 | 1/1997 | Corder et al. | 296/116 |
| 5,743,587 | 4/1998 | Alexander et al. | 296/117 |
| 5,769,483 | 6/1998 | Danzl et al. | 296/116 |
| 5,810,422 | 9/1998 | Corder et al. | 296/116 |

*Primary Examiner*—Joseph D. Pape
*Assistant Examiner*—Kiran Patel
*Attorney, Agent, or Firm*—Evenson, McKeown, Edwards, Lenahan, P.L.L.C.

[57] ABSTRACT

A convertible automobile has a two-part foldable hard top which can be lowered into a storage area at the rear. The roof part and the rear part are releasably connected with one another in the vicinity of their common contact edge by a sealing arrangement. A separate drive mechanism is provided for the roof part as well as for the rear part. Both drive mechanisms are controllable independently of one another.

3 Claims, 4 Drawing Sheets

ROOF STRUCTURE OF AN OPEN AUTOMOBILE

BACKGROUND AND SUMMARY OF THE INVENTION

This application claims the priority of German application 196 35 536.2, the disclosure of which is expressly incorporated by reference herein.

The present invention relates to a removable roof structure for an open automobile, the structure having a dimensionally stable roof part and a dimensionally stable rear part. The roof structure is lowerable into a storage area behind the front seats of the passenger compartment, with the rear part having a rear window as well as two C-pillar sections.

The Mercedes-Benz SLK Roadster provides a convertible automobile with a two-part hard top, consisting of a roof part and a rear part. The roof part and the rear part are connected with one another in a pivotably movable fashion. The entire roof structure in the form of a hard top is foldable and lowerable into a storage area behind the passenger compartment. The C-pillar sections and rear window of the roof structure are integrated in the rear. The roof structure formed by the two-part hard top is thus located either in its closed functional position or in its open resting position, in which the hard top is folded and lowered in the storage area.

An object of the present invention is to provide an improved roof structure of a convertible automobile which ensures a greater number of different opening states for the passenger compartment.

This object has been achieved according to the present invention by releasably connecting the roof part and the rear part with one another in the vicinity of their common joining edges by a latching device. Independent drive mechanisms are provided for both the roof part and the rear part, with both drive mechanisms being controllable independently of one another.

The separate release of the rear part from the roof part has the advantage of making possible movement of the rear part into its lowered resting position independently of the roof part, thus creating a landaulet while the roof part is still closed. By additionally lowering the roof part, a completely open convertible can be created. Depending on the configuration of the drive mechanisms, a "Targa roof" can be achieved with the concept according to the present invention, in which the rear part remains in its closed functional position and only the roof part, conceivably as a result of a brief raising of the rear part, is lowered into the storage area.

In one advantageous embodiment of the present invention, the drive mechanism for the rear part has lever kinematics for rotating the rear part into a resting position and lowering the rear part in which the rear window of the rear part is at the bottom and the C-pillar sections of the rear part are aligned so that they project upward. As a result, in its lowered resting position, the rear part has the shape of a receiving shell within which the roof part can be accommodated with economy of space.

In another embodiment of the present invention, the drive mechanism for the roof part has a parallelogram linkage with which the roof part can be lowered onto the rear part between the C-pillar sections. The provision of a parallelogram linkage constitutes a simple yet functionally reliable configuration.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
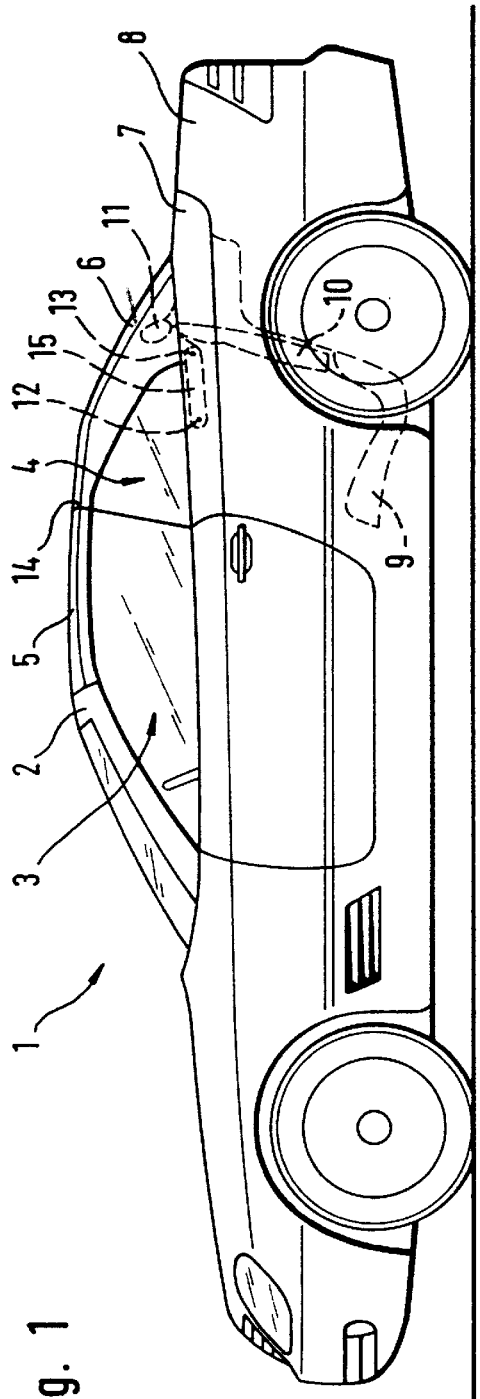
FIG. 1 is a side elevational view showing one embodiment of an automobile according to the present invention using a closed, two-part hard-top.

An automobile designated generally by numeral 1 in FIGS. 1 to 7 is an open (convertible) automobile provided with a roof structure in the form of a two-part hard top mounted to be movable between a closed functional position and a lowered resting position. The roof structure in the forward travel direction abuts a windshield frame 2 of the vehicle body and in its closed functional position covers a passenger compartment 3 of automobile 1. Passenger compartment 3 consists of a front section and a rear 4.

A vehicle rear portion 8 abuts the roof structure at the rear. In order to be able to lower the roof structure in the manner described in greater detail below into a storage area of rear 4, a storage area lid 7 is articulated in a pivotally movable manner to the vehicle body in the vicinity of vehicle rear 8 and can be deployed diagonally upward to lower a rear part 6 of the roof structure.

The roof structure has a roof part 5 and a rear part 6 which abut one another along a contact edge 14 in the vehicle travel direction in its closed functional position. Roof part 5 spans the front area of passenger compartment 3 and is attached to windshield frame 2 by a latch in a sealed manner in its closed functional position. Roof part 5 has a panel-shaped appearance and is provided in the vicinity of roof frame parts, with gaskets to form a tight closure with the frameless side windows of automobile 1. Like roof part 5, rear part 6 of the roof structure is configured to be dimensionally stable. Rear part 6 has a shell-type shape and in its closed functional position fits flush against rear contact edge 14 of roof part 5. Both sides of the rear part 6 have two C-pillar sections that extend diagonally downward to the level of the side of the vehicle. The two C-pillar sections flank a rear window that is preferably made of glass and is dimensionally stable. The C-pillar sections and the rear window are integrated in one piece into rear part 6. In the vicinity of their common contact edge 14, roof part 5 and rear part 6 are connected releasably with one another by a latching arrangement in a generally known manner.

Figure 7:
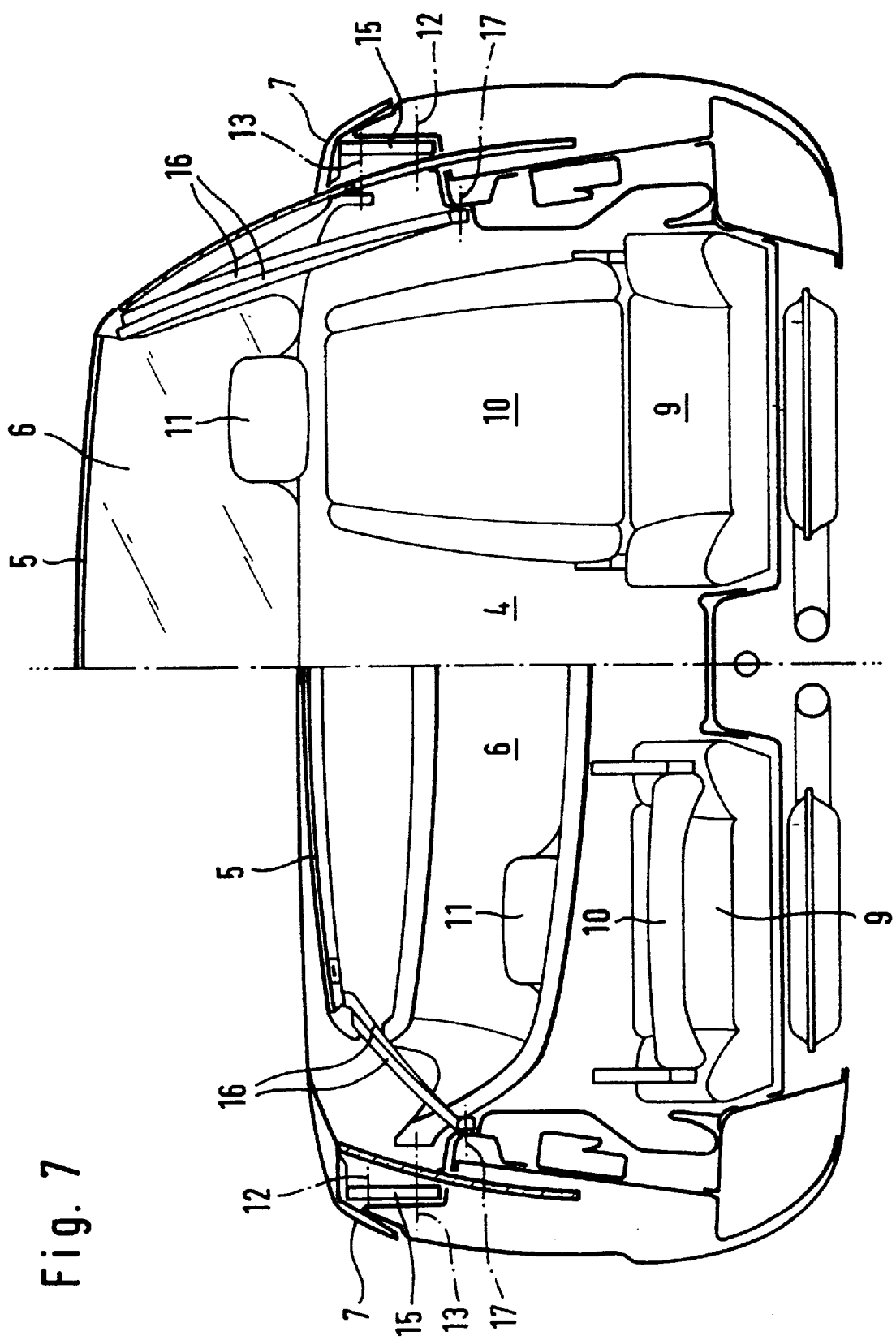
FIG. 7 is a cross-sectional front elevational view of the automobile of FIGS. 1 to 6 at the rear level, with the completely open position of the roof structure being shown in the left half of the drawing and the completely closed functional position of the roof structure being shown in the right half of the drawing.

Roof part 5 and rear part 6 each have their own drive mechanism for lowering the rear part 6 and roof part 5 independently of one another into a rear storage area 4. Rear area 4 is provided with rear seats, each composed of a fixed seat area 9 and a rear seat back 10 which can be folded forward. By folding rear seat backs 10 forward, sufficient storage area is provided in rear area 4 for lowering rear part 6 and roof part 5 below the level of the side of the vehicle. Two headrests 11 are mounted on an interior of rear part 6 and are associated with rear seat backs 10 of the rear seats (area 9) in the closed functional position of rear part 6 as seen in FIGS. 1 and 7.

Figure 4:
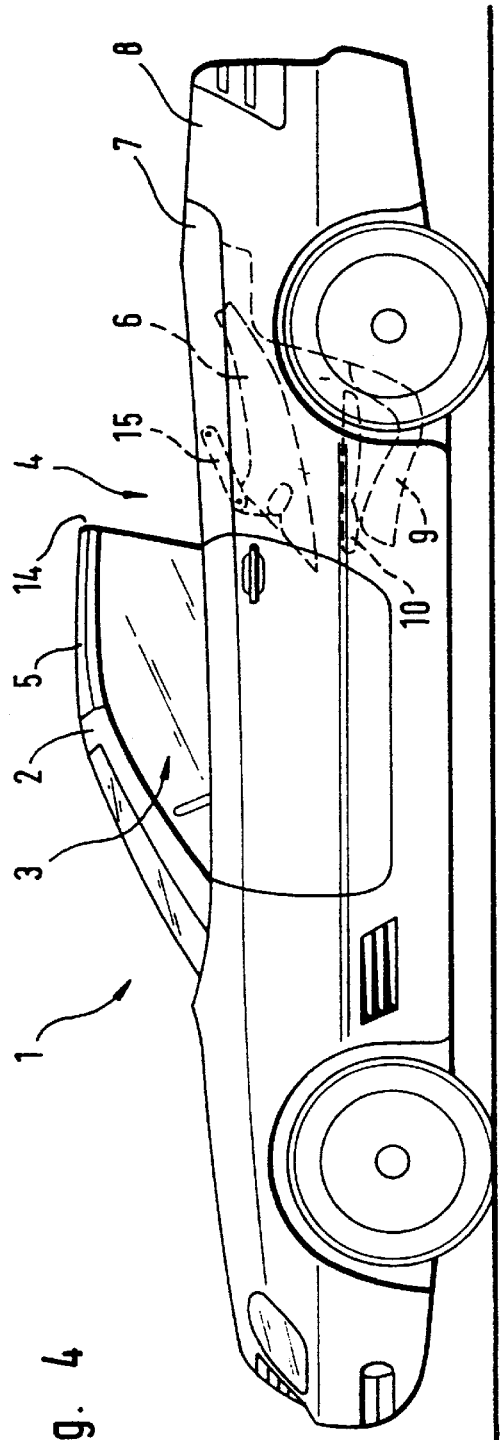
FIG. 4 is a side elevational view of the automobile according to FIGS. 1 to 3 but with the rear part completely lowered.

The drive mechanism for lowering rear part 6 into its open resting position, as seen in FIG. 4, has lever kinematics articulated firstly around rotational axis 13 on rear part 6 and secondly around a fixed rotational axis 12 on the vehicle body just below the top of the side of the vehicle. A critical part of the lever kinematics consists of two stable drive levers 15 shown in FIG. 7 which flank rear part 6 externally on both sides and are mounted integrally with the body by rotational axis 13 and by a rotational axis 12 with rear part 6. The drive mechanism for roof part 5 has a parallelogram linkage 16 mounted on a pivot axis 17 integral with the vehicle body. Both drive mechanisms for roof part 5 and rear part 6 have electrical, electrohydraulic or hydraulic positioning drives which effect the movement of roof part 5 and rear part 6.

Rear part 6 is rotated by lever kinematics (lever 15) of the corresponding drive mechanism through nearly 180° around a horizontal axis and is simultaneously lowered into the storage area of rear area 4, so that in the lowered resting position, the rear window of rear part 6 is located at the bottom. At the same time, the C-pillar sections of rear part 6 project upward so that rear part 6 forms a receiving shell for roof part 5, still to be lowered. The lever kinematics is so configured that rotation of rear part 6 clockwise, as shown in FIGS. 1 to 6, takes place while drive levers 15 of the lever kinematics are simultaneously tipped forward counterclockwise around rotational axis 12 (see the direction of the arrow in FIG. 3). In addition to drive levers 15, the lever kinematics has additional supporting and guide elements.

Figure 2:
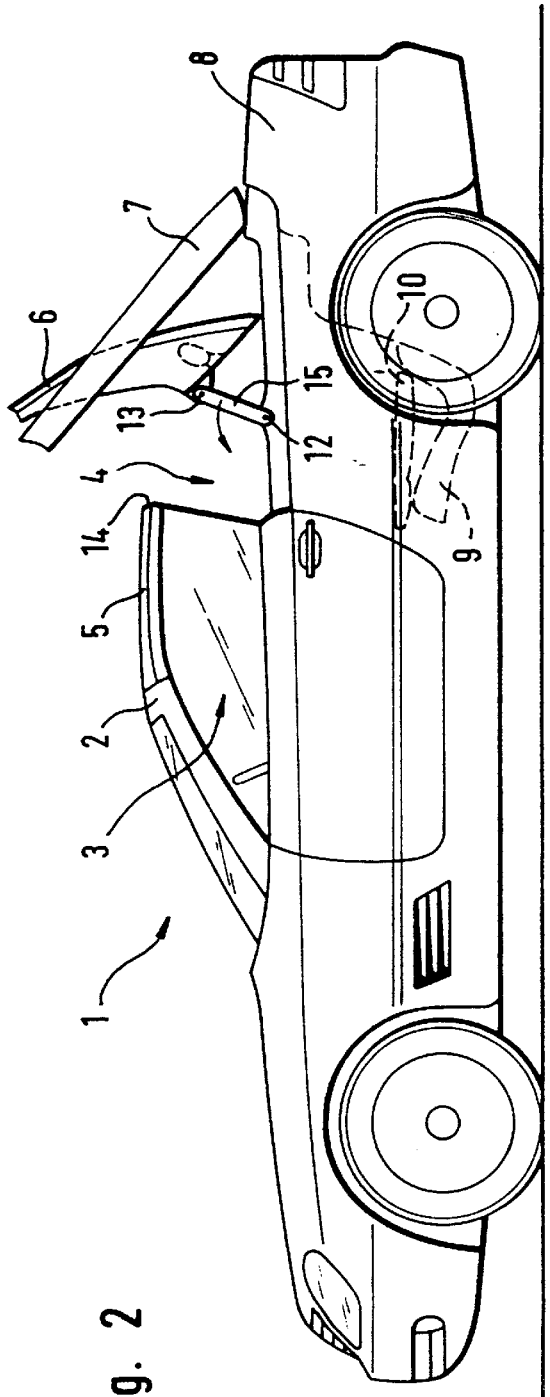
FIG. 2 is a similar side elevational view of the automobile according to FIG. 1 but with a partially opened rear part of the roof structure.
Figure 3:
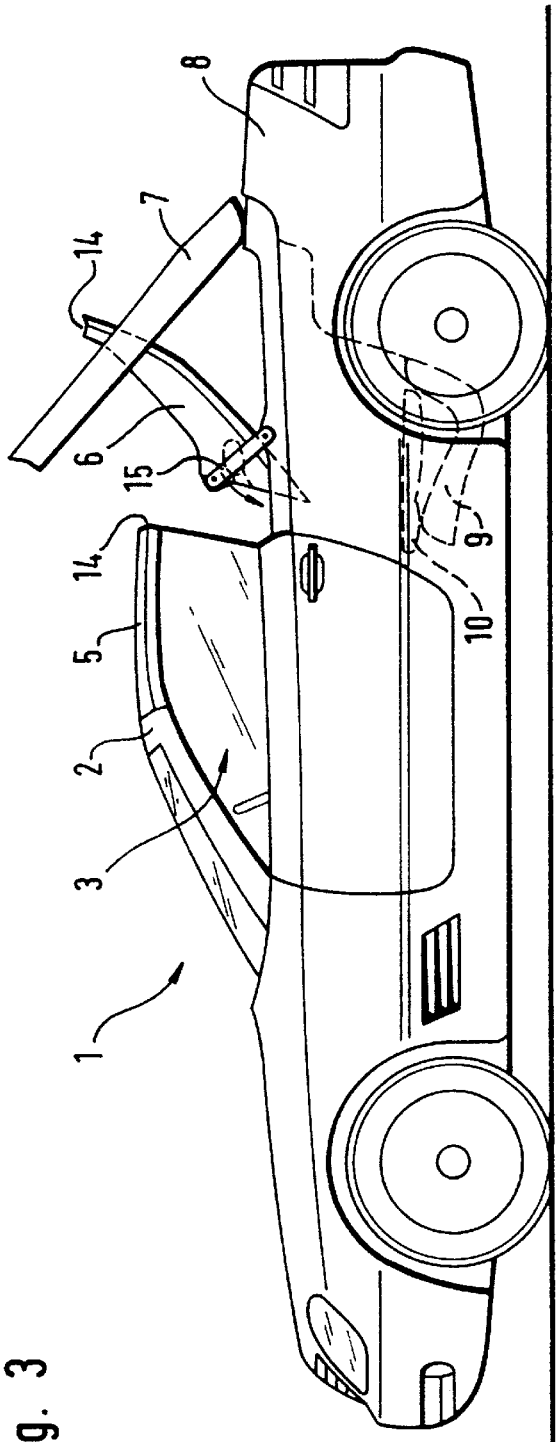
FIG. 3 shows another opening stage of the rear part of the roof structure shown in FIG. 2.

As can be seen from FIGS. 1 to 3, in order to lower rear part 6, storage area lid 7 is initially deployed diagonally upward, causing the storage area of rear area 4 to be completely revealed. Then, after the latching arrangement is released, rear part 6 is stored in its completely lowered resting position as shown in FIGS. 2 to 4 in the storage area. Roof part 5 remains in its closed functional position shown in FIGS. 1 to 4 during this opening process, with the latch between roof part 5 and frame 2 being locked. In this position, the front-area of passenger compartment 3 is open at the rear, resulting in a landaulet arrangement.

Figure 5:
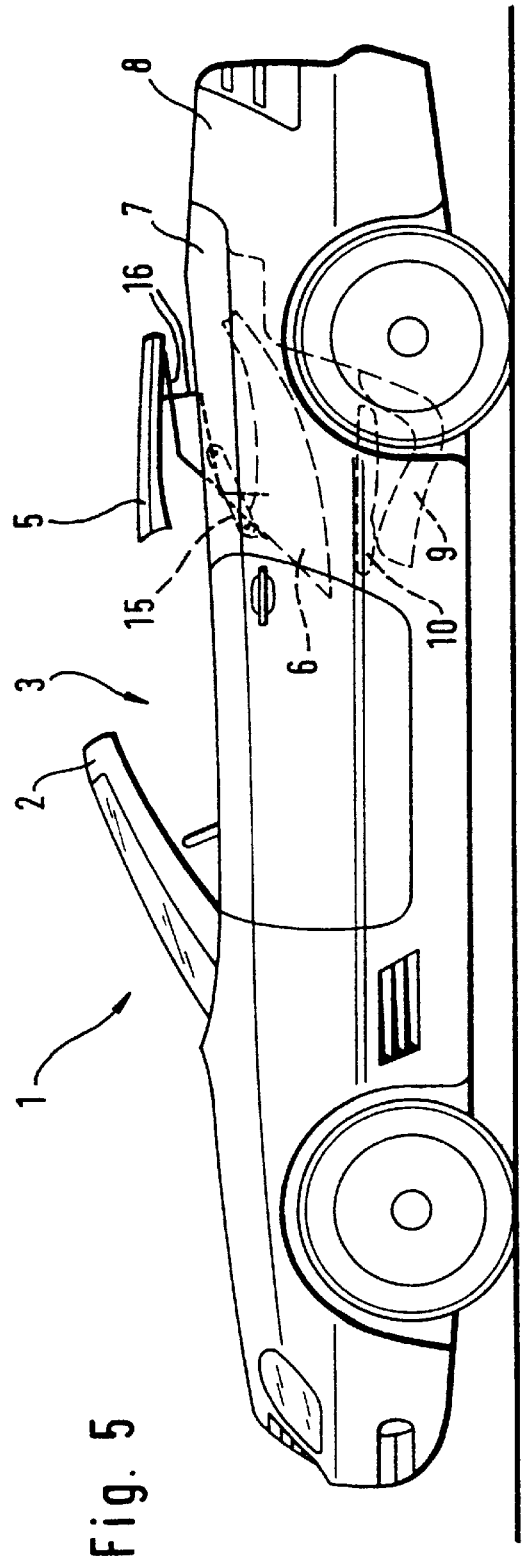
FIG. 5 is a view of the automobile similar to FIG. 4 but during the opening process of the roof part.
Figure 6:
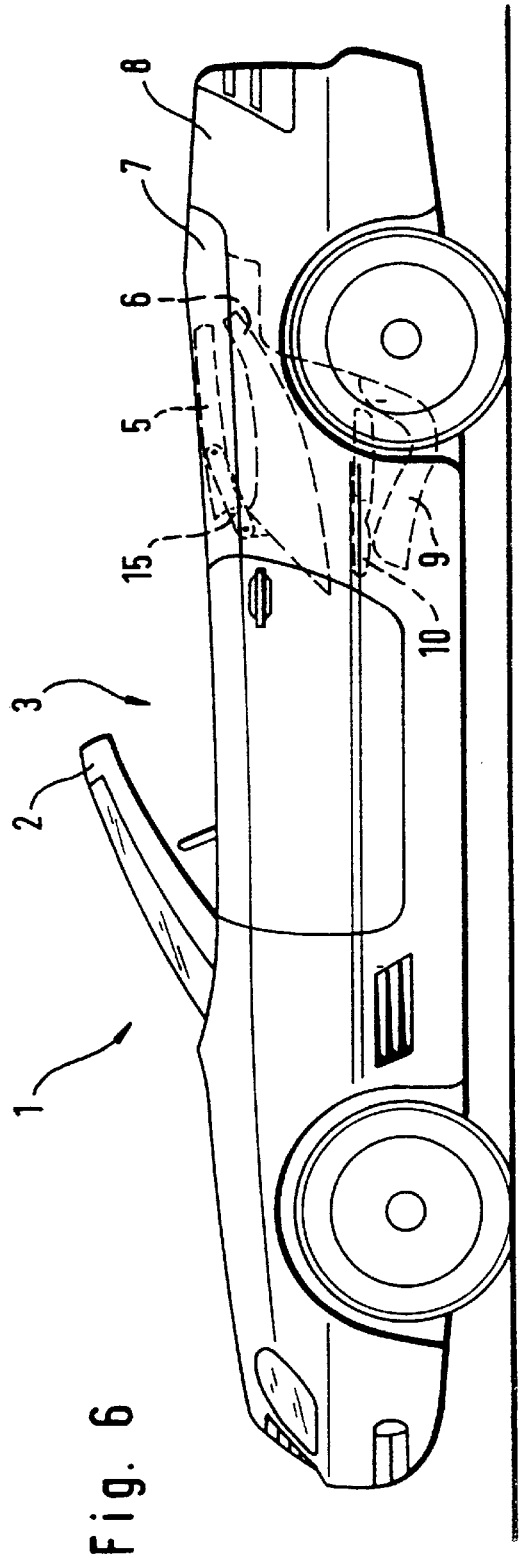
FIG. 6 is a view of the automobile similar to FIG. 5 in its completely open convertible state.

In order to lower roof part 5 as well to achieve a completely open convertible state, the latch on windshield frame 2 is released first. Then roof part 5 is displaced roughly parallel rearward and downward by its associated drive mechanism and the associated parallelogram linkage 16. Roof part 5 is lowered between the C-pillar sections of rear part 6 as seen in FIGS. 5 and 6. To lower roof part 5, storage area lid 7 can remain in its closed position because the width of roof part 5 is smaller than the distance between the legs of U-shaped storage area lid 7 as best seen in FIG. 7.

The roof structure is closed again in the reverse order, with first roof part 5 and then rear part 6 being transferred once again into the closed functional position.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Movable roof structure of an automobile, comprising a dimensionally stable roof part arranged to be associated with a front windshield of the automobile and a dimensionally stable rear part, the roof part and rear part being configured to be lowerable into a storage area behind front seats in a passenger compartment, the rear part having a rear window and two-C-pillar sections, wherein the roof part and rear part are releasably connected with one another in the vicinity of a common joining edge, and independent drive mechanisms are operatively associated with the roof part and the rear part, with both drive mechanisms being controllable independently of one another.

2. The roof structure according to claim 1, wherein the drive mechanism for the rear part is configured for rotating and lowering the rear part into a position in which the rear window is located on the bottom and the C-pillar sections of rear part are aligned to project upwardly.

3. The roof structure according to claim 1, wherein the drive mechanism for the roof part comprises a parallelogram linkage for lowering the roof part onto the rear part between the C-pillar sections.

* * * * *